United States Patent Office 3,813,391
Patented May 28, 1974

3,813,391
7 - [β - (o - AMINOMETHYLPHENYL)PROPION-AMIDO] - 3 - (TETRAZOLO[4,5-b]PYRIDAZIN-6-YLTHIOMETHYL) - 3 - CEPHEM-4-CARBOXYLIC ACID
Takayuki Naito, Tokyo, and Jun Okumura and Hajime Kamachi, Yokohama, Japan, assignors to Bristol-Myers Company, New York, N.Y.
No Drawing. Filed Sept. 6, 1972, Ser. No. 286,793
Int. Cl. C07d 99/24
U.S. Cl. 260—243 C                              7 Claims

ABSTRACT OF THE DISCLOSURE

7 - [β-(o-aminomethylphenyl)propionamido]-3-(tetrazolo[4,5-b]pyridazin - 6 - ylthiomethyl) - 3 - cephem-4-carboxylic acid and its nontoxic, pharmaceutically acceptable salts and especially its dimethanesulfonate derivative are valuable as antibacterial agents, as nutritional supplements in animal feeds and as therapeutic agents in poultry and animals, including man, and are especially useful in the treatment of infectious diseases caused by many Gram-positive and Gram-negative bacteria. 7-[β-(o-aminomethylphenyl)propionamido]-3-(tetrazolo[4,5 - b] pyridazin-6-ylthiomethyl)-3-cephem-4 - carboxylic acid is prepared, for example, by treatment at 0° C. with trifluoroacetic acid of the corresponding compound in which the free amino group is protected with a tert.butoxycarbonyl group.

BACKGROUND OF THE INVENTION (1) Field of the invention

The cephalosporins of the present invention possess the usual attributes of such compounds and are particularly useful in the treatment of bacterial infections.

(2) Description of the prior art

Cephalothin and cephaloridine are well-known antibacterial agents; see U.S. Pats. 3,218,318; 3,449,338 and 3,498,979. The patent literature also contains considerable data on cephaloglycin and cephalexin; see U.S. Pats. 3,303,193; 3,422,103; 3,364,212 and 3,507,861 and Great Britain 985,747; 1,054,806 and 1,174,335 and Belgium 696,026 (Farmdoc 29,494) and South Africa 67/1,260 (Farmdoc 28,654). Newer cephalosporins include cefazolin and cephapirin; see U.S. Pat. 3,516,997 [and also Netherlands 6805179 (Farmdoc 34,328) and South Africa 68/4,513] and U.S. Pat. 3,422,100.

The literature on cephalosporins has been reviewed, for example, by E. P. Abraham, Pharmacol. Rev. 14, 473–500 (1962), by I. M. Rollo, Ann. Rev. Pharmacol. 6, 218–221 (1966), by E. P. Abraham, Quart. Rev. (London) 21, 231 (1967), by E. Van Heyningen, Advan. Drug Res., 4, 1–70 (1967), by G. T. Stewart, The Penicillin Group of Drugs, Elsevier Publishing Company, New York, N.Y. (1965) at pages 185–192 and briefly in Annual Reports in Medicinal Chemistry, Academic Press, Inc., 111 Fifth Ave., New York, N.Y. 10003, by L. C. Cheney on pages 96–97 (1967), by K. Gerzon and R. B. Morin on pages 90–93 (1968), by K. Gerzon on pages 78–80 (1969) and by L. H. Conover on pages 101–102 (1970). New cephalosporins are frequently reported at the annual Interscience Conference on Antimicrobial Agents and Chemotherapy as illustrated by Sassiver et al., Antimicrobial Agents and Chemotherapy—1968, American Society for Microbiology, Bethesda, Md., pages 101–114 (1969) and by Nishida et al., ibid, 236–243 (1970). Two excellent recent reviews are The Cephalosporins Microbiological, Chemical and Pharmacological Properties and Use in Chemotherapy of Infection, L. Weinstein and K. Kaplan, Annals of Internal Medicine, 72, 729–739 (1970) and Structure Activity Relationships Among Semisynthetic Cephalosporins, M. L. Sassiver and A. Lewis, Advances in Applied Microbiology, edited by D. Perlman, 13, 163–236 (1970), Academic Press, New York.

7-phenylacetamidocephalosporanic acid has also been named N-phenylacetyl derivative of 7–ACA, cephaloram, PACA and apparently phenasporin. Publications in the scientific literature on the preparation and/or properties of this compound, with or without substituents in the benzene ring, and corresponding compounds in which the 3-acetoxymethyl group has been replaced by methyl hydroxymethyl and/or pyridiniummethyl include the following:

Chauvette, R. R., et al. "Chemistry of Cephalosporin Antibiotics II. Preparation of a New Class of Antibiotics and the Relation of Structure to Activity," Journal of the American Chemical Society, 84 3401–3402 (1962).

Chauvette, R. R., et al. "Structure-Activity of Relationships Among 7-Acylamidocephalosporanic Acids," Antimicrobial Agents and Chemotherapy—1962, 687–694.

Cocker, J. D., et al., "Cephalosporanic Acids. Part II. Displacement of the Acetoxy-group by Nucleophiles," Journal of the Chemical Society, 5015–5031 (1965).

Cocker, J. D., et al., "Cephalosphoranic Acids. Part IV. 7 - Acylamidoceph-2-em-4-carboxylic Acids," Journal of the Chemical Society, 1142–1151 (1966).

Culp, H. W., et al., "Metabolism and Absorption of the 7 - (Phenylacetamido-1C$^{14}$)-Cephalosporanic Acid," Antimicrobial Agents and Chemotherapy—1963, 243–246.

Jago, M., "Antibacterial Activity of Some Derivatives of 7-Aminocephalosporanic Acid Against Staphylococcus aureus and Synergism Between These and Other Antibiotics," Brit. J. Pharmacol., 22, 22–23 (1964).

Loder, B., et al., "The Cephalosporin C Nucleus (7-Aminocephalosporanic Acid) and some of its Derivatives," Biochemical Journal, 79, 408–416 (1961).

Nishida, M., et al., "Studies on Microbial Degradation of Cephalosporin C Derivatives. II," The Journal of Antibiotics, 21, 375–378 (1968).

Nishida, M., et al., "Studies of Microbial Degradation of Cephalosporin C Derivatives I," The Journal of Antibiotics, 21, 165–169 (1968).

Spencer, J. L., et al., "Chemistry of Cephalosporin Antibiotics VIII. Synthesis and Structure-Activity Relationships of Cephaloridine Analogues," Antimicrobial Agents and Chemotherapy—1966, 573–580.

Stedman, R. J., et al., "7-Aminodesacetoxycephalosporanic Acid and its Derivatives," J. Med. Chem., 7(1), 117–119 (1964).

Sullivan, H. R., et al., "Metabolism of Oral Cephalothin and Related Cephalosporins in the Rat," Biochemical Journal, 102, 976–982 (1967).

Vymola, F., et al., "The Classification and Characteristics of Cephalosporin Antibiotics I. Systematic Study of the Quantitative Sensitivity of Some Pathogenic Microorganisms to Cephaloridine," Journal of Hygiene, Epidemiology, Microbiology and Immunology, 10, 180–189 (1966).

Many other 7-acyl derivatives of 7-aminocephalosporanic acid have been reported in the patent literature including 7-[4-α-(aminoalkyl)phenylacetamido]cephalosporanic acids (U.S. 3,382,241), 7-[(p-aminophenylthio)acetamido]-cephalosporanic acid (U.S. 3,422,100), 7-[(o-aminomethylphenylthio)acetamido]cephalosporanic acid (U.S. 3,657,232), 7-(halophenylthioacetamido)cephalosporanic acids (U.S. 3,335,136) and the nearly unlimited number of variations of such compounds encompassed by the generic formulae (and often not otherwise described) of such patents as Netherlands 6902013 (Farmdoc 39,172). 7-(p-aminophenylactamido)-cephalosporanic acid is disclosed in U.S. Pat. 3,422,103 as is the corresponding N-trityl derivative; see also Japan 2,712/67 (Farmdoc 25,406).

U.S. Pat. 3,219,662 includes claims to compounds of the structure R—CH$_2$—CO—ACA in which R is phenyl, nitrophenyl (especially para-nitro), chlorophenyl, alkylphenyl and alkoxyphenyl and the corresponding phenoxy and substituted compounds and for all of those the corresponding compounds in which the 3-acetoxymethyl group has been replaced by a 3-pyridiniummethyl group. A more extensive group of such compounds, including the series in which R is phenylthio and also the compound in which R is benzyl [i.e., 7-($\beta$-phenylpropionamido)cephalosporanic acid], alkoxybenzyl, alkanoyloxybenzyl, aminobenzyl, etc. are disclosed, at least generically, for use as starting materials in United Kingdom 1,012,943 (corresponding to U.S. 3,278,531 which is discussed further below) and 1,153,421 (Farmdoc 23,984) and see also United Kingdom 1,001,478 and U.S. 3,280,118, 3,258,461 and 3,338,896. Additional 7-phenylacetamidocephalosporanic acids having substituents on the benzene ring including hydroxy and amino are disclosed as starting materials in United Kingdom 1,082,943 and 1,082,962.

U.S. Pat. 3,341,531 describes the 7-(o-, m- and p-carboxamidomethylphenylacetamido)cephalosporanic acids and their betaines. A variety of 7-(halo-, dihalo-, nitro- and halonitro-phenylacetamido)cephalosporanic acids are named as starting materials for reaction with certain nucleophiles in U.S. Pat. 3,431,259 (Farmdoc 27,715). Additional 7-(phenylacetamido)cephalosporanic acids having various substituents on the benzene ring are disclosed in Japan 2,712/67 (Farmdoc 25,406), Japan 26,105/69 (Farmdoc 40,860), Great Britain 1,178,471 (Farmdoc 27,715, see Netherlands 6700906) and Japan 25,785/69 (Farmdoc 40,847).

Replacement of the 3-acetoxy group of a cephalosporin by various heterocyclic thiols has been disclosed (a) in South Africa 70/2,290 [see also Netherlands 7005519 (Farmdoc 80,188R)] where the sidechains were, for example, 7 - $\alpha$ - aminophenylacetamido and typical heterocyclic thiols were 2-methyl-1,3,4-thiadiazole-5-thiol and 1-methyl-1,2,3,4-tetrazole-5-thiol, and (b) in U.S. 3,516,997 where the sidechains at the 7-position had structures such as R$^3$—(alk)m—CO—NH— and R$^3$—S—(alk)m—CO—NH— in which R$^3$ was one of many aromatic heterocycles and the numerous heterocyclic thiols at the 3-position included, for example, 1-methyl-tetrazole - 5 - thiol and 2-methyl-1,3,4-thiadiazole-5-thiol, and (c) in U.S. Pat. 3,563,983.

U.S. Pat. 3,492,297 includes 7-(p-guanidinophenylacetamido)cephalosporanic acid and its betaine.

In cephaloridine the 3-acetoxy group of cephalothin was replaced by a pyridinium group as described, for example, in U.S. Pats. 3,449,338 and 3,498,979.

The preparation of various 7-[$\alpha$-amino-arylacetamido]-cephalosporanic acids and the corresponding desacetoxy compounds in which aryl represents unsubstituted or substituted phenyl or 2- or 3-thienyl is described, for example, in British specifications 985,747; 1,017,624; 1,054,806 and 1,123,333, in Belgian patent 696,026 (Farmdoc No. 29,494), in U.S. Pats. 3,311,621; 3,352,858; 3,489,750; 3,489,751; 3,489,752 and 3,518,260, in Japanese Pat. 16,871/66 (Farmdoc 23,231), by Spencer et al., *J. Med. Chem.*, 9(5), 746–750 (1966) and by Kurita et al., *J. Antibiotics* (Tokyo) (A) 19, 243–249 (1966) and see also U.S. Pat. 3,485,819.

Netherlands Pats. 6811676 (Farmdoc 36,349) and 6812382 (Farmdoc 36,496) and U.S. Pats. 3,489,750 and 3,489,751 and 3,489,752 disclose ring-substituted cephaloglycins.

Various 7-[$\alpha$ - amino - arylacetamido]cephalosporins in which one hydrogen of the $\alpha$-amino group is replaced by a carbonyl group which is attached in turn to another moiety have been reported. The earliest were the cephaloglycin and cephalexin precursors in which use was made of a common peptide blocking group such as carbobenzyloxy as illustrated by U.S. Pat. 3,364,212, Belgian Pat. 675,298 (Farmdoc 22,206), South African Pat. 67/1,260 (Farmdoc 28,654) and Belgian Pat. 696,026 (Farmdoc 29,494). Related compounds include those of U.S. Pats. 3,303,193 and 3,311,621 and 3.518,260.

Various cephalosporins, including cephalosporin C on occasion, have been reacted with nucleophilic, aromatic mercaptans to produce compounds having the structure

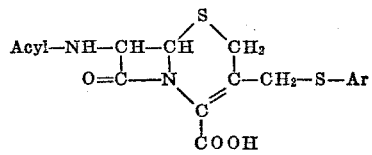

In U.S. Pat. 3,278,531 Ar is phenyl or certain substituted phenyls or certain aromatic heterocyclic rings named, for example, in column 5; in that patent (which corresponds to United Kingdom 1,012,943) "acyl" in the formula above is defined, among many other meanings, as including phenylacetyl, $\beta$-phenylpropionyl and phenylthioacetyl with or without various named substituents for the benzene ring. Similar nucleophiles, e.g. 2-mercaptopyrimidines, are disclosed in U.S. 3,261,832 and Great Britain 1,101,422 and U.S. 3,479,350 and U.S. 3,502,665, all issued to Glaxo. A parallel disclosure is found in Great Britain 1,109,525 to Ciba, e.g. in definition "h" for R$_3$. Additional nucleophiles of this type were disclosed by Fujisawa in Belgium 714,518 (Farmdoc 35,307; Netherlands 6806129 and South Africa 2,695/68), in Canada 818,501 (Farmdoc 38,845), in Great Britain 1,187,323 (Farmdoc 31,936; Netherlands 6714888) and especially in U.S. 3,516,997 (Farmdoc 34,328; Netherlands 6805179) which includes the compound named cefazolin, which has a tetrazolylacetyl sidechain on the 7-amino group and a 5-methyl-thiadiazolylthiomethyl group at the 3-position and is described at some length in the scientific literature, e.g. in Antimicrobial Agents and Chemotherapy 1969, American Society for Microbiology, Bethesda, Md. at pages 236–243 and in J. Antibiotics (Japan) 23(3), 131–148 (1970).

More recently, replacement of the 3-acetoxy group of a cephalosporin by various heterocyclic thiols has been disclosed in U.S. 3,563,983 and in Netherlands 7005519 (Farmdoc 80,188R) where the sidechains were, for example, 7-$\alpha$-aminophenylactamido and typical heterocyclic thiols were 2-methyl-1,3,4-thiadiazole-5-thiol and 1-methyl-1,2,3,4-tetrazole-5-thiol; the latter corresponds to U.S. Pat. 3,641,021, issued Feb. 8, 1972 on an application filed Apr. 18, 1969. Additional similar disclosures are found in U.S. Pat. 3,563,983, Belgian 771,189 (Farmdoc 12,817T), Japan 72/5,550 (Farmdoc 12,921T) and Japan 72/5,551 (Farmdoc 12,922T).

Various cephalosporins having the structure

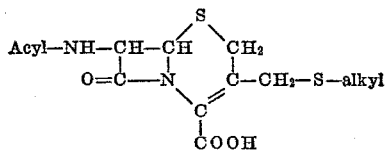

in which acyl represents various sidechains including $\alpha$-aminophenylacetyl have been described in some of the above and by Glaxo in Belgium 734,532 (Farmdoc 41,619) and in Belgium 734,533 (Farmdoc 41,620) and in U.S. 3,668,203.

Cephalosporins having the structure

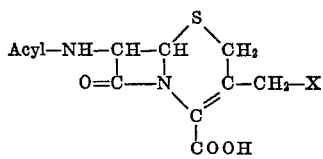

where X includes

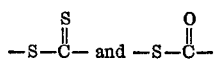

are disclosed in some of the above and in U.S. 3,239,515; 3,239,516; 3,243,435; 3,258,461; 3,431,259 and 3,446,803.

Related publications in the scientific literature include J. Med. Chem. *8*, 174–181 (1965) and J. Chem. Soc. (London) 1595–1605 (1965), 5015–5031 (1965) and 1959–1963 (1967).

6-Mercaptotetrazolo[4,5-b]pyridazine was described by B. Stanovnik et al., J. Org. Chem. *35(4)*, 1138–1141 (1970) as their compound 8 (R=H) under the name 6-mercaptotetrazolo[1,5-b]pyridazine.

SUMMARY OF THE INVENTION

This invention comprises the amphoteric compound of the formula

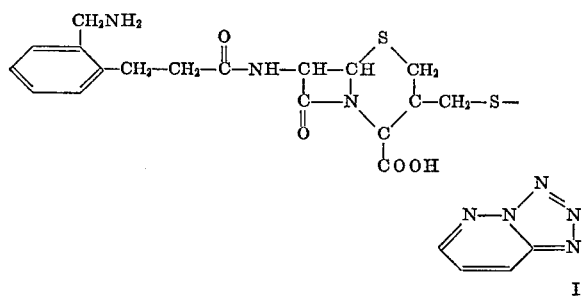

which exists primarily as the zwitterion, its dimethanesulfonate derivative and their nontoxic, pharmaceutically acceptable salts and easily hydrolyzed esters.

Such salts include the nontoxic carboxylic acid salts thereof, including nontoxic metallic salts such as sodium, potassium, calcium and aluminum, the ammonium salt and substituted ammonium salts, e.g. salts of such nontoxic amines as trialkylamines including triethylamine, procaine, dibenzylamine, N-benzyl-beta-phenethylamine, 1-ephenamine, N,N' - dibenzylethylenediamine, dehydroabietylamine, N,N' - bis - dehydroabietylethylenediamine, N - (lower) - alkylpiperidine, e.g. N-ethylpiperidine, and other amines which have been used to form salts with benzylpenicillin; and the nontoxic, acid addition salts thereof (i.e., the amine salts) including the mineral acid addition salts such as the hydrochloride, hydrobromide, hydroiodide, sulfate, sulfamate and phosphate and the organic acid addition salts such as the maleate, acetate, citrate, oxalate, succinate, benzoate, tartrate, fumarate, malate, mandelate, ascorbate and the like.

Also included in this invention are the compounds (used as either intermediates or metabolic precursors) in which the amino group is "blocked" by substituents such as t-butoxycarbonyl, carbobenzyloxy, formyl, o-nitrophenylsulfenyl, β,β,β-trichloroethoxycarbonyl, 4-oxo-2-pentenyl-2,1 - carbomethoxy - 1 - propenyl-2-and the like. Particularly included in such blocking groups are the ketones (especially acetone) and aldehydes (especially formaldehyde and acetaldehyde) disclosed, for example, in U.S. Pats. 3,198,804 and 3,347,851 and the β-ketoesters and β-diketones disclosed, for example, in U.S. Pat. 3,325,479 and the β-ketoamides disclosed in Japan 71/24,714 (Farmdoc 47,321S).

There is also provided, according to the present invention, the process for the preparation of the compound having the formula

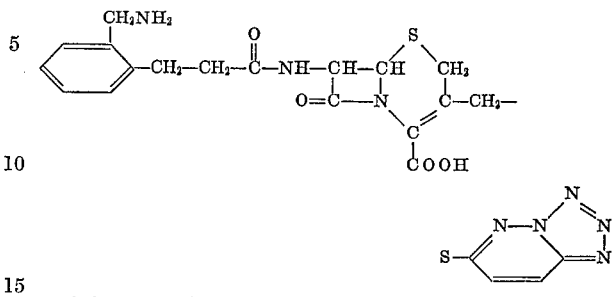

and the nontoxic salts and easily hydrolyzed esters thereof which comprises reacting the compound of the formula

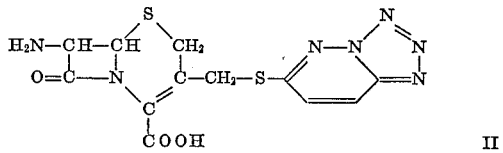

II or a salt or easily hydrolyzed ester thereof with an acylating derivative of the acid (in which the amino group is protected) having the formula

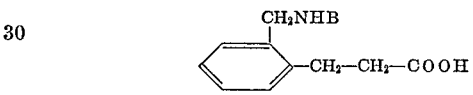

wherein B represents the amino-protecting group (that is, with that acid or its reactive derivative substituted at the carboxyl group) to produce the compound (in which the amino group is protected) having the formula

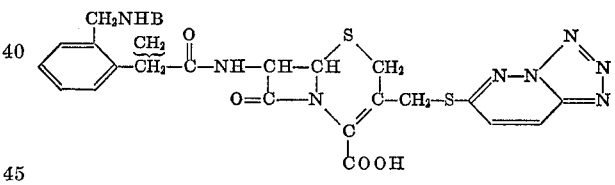

or the corresponding salt or easily hydrolyzed ester thereof wherein B represents the amino-protecting group, and subsequently subjecting the resulting compound to chemical removal of the amino-protecting group, that is, subjecting the resulting compound to elimination reaction of the protecting group.

The amphoteric compound of the present invention is prepared according to the present invention by coupling with a particular 3-thiolated-7-aminocephalosporanic acid designated II, that is, 7-amino-3-(tetrazolo[4,5-b]pyridazin-6-ylthio-methyl)-3-cephem-4-carboxylic acid or a salt or easily hydrolyzed ester thereof (including, but not limited to, those of U.S. Pat. 3,284,451 and United Kingdom 1,229,453 and any of the silyl esters described in U.S. Pat. 3,249,622 for use with 7-amino-penicillanic acid and used in Great Britain 1,073,530 and particularly the pivaloyloxymethyl, acetoxymethyl, methoxymethyl, acetonyl, phenacyl, p-nitrobenzyl and β,β,β-trichloroethyl esters) a particular acid or its functional equivalent as an acylating agent for a primary amino group. After coupling, the blocking group is removed to give the desired product. Said acid has the formula

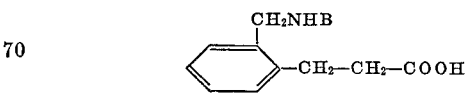

wherein B represents a blocking group of the type used either in peptide syntheses or in any of the numerous syntheses of ampicillin or cephaloglycin or cephalexin from 2-phenylglycine. Particularly valuable blocking groups are a proton, as in the compound of the formula

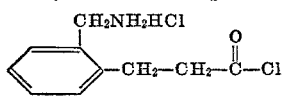

or a β-diketone or β-ketoester as in Great Britain 1,123,-333 and U.S. 3,325,479 and U.S. 3,316,247, e.g., methyl acetoacetate, or a β-ketoamide as in Japan 71/24,714 (Farmdoc 47, 321S) in which case the acid containing the blocked amino group is preferably converted to a mixed anhydride, as with ethyl chloroformate, before reaction with compound II or a salt thereof to form the desired product I after acid cleavage.

Further to the discussion above of blocking groups used on the free amino group of the sidechain acid during its coupling with compound II, the blocking group is then removed to form the products of the present invention, e.g., the t-butoxy-carbonyl group is removed by treatment with formic acid, the carbobenzyloxy group is removed by catalytic hydrogenation, the 2-hydroxy-1-naphthcarbonyl group is removed by acid hydrolysis and the trichloroethoxycarbonyl group by treatment with zinc dust in glacial acetic acid. Obviously other functionally equivalent blocking groups for an amino group can be used and such groups are considered within the scope of this invention.

Thus, with respect to said acid to be used to couple with compound II, functional equivalents include the corresponding acid anhydrides, including mixed anhydrides and particularly the mixed anhydrides prepared from stronger acids such as the lower aliphatic monoesters of carbonic acid, or alkyl and aryl sulfonic acids and of more hindered acids such as diphenylacetic acid. In addition, an acid azide or an active ester or thioester (e.g., with p-nitrophenyl, 2,4-dinitrophenol, thiophenol, thioacetic acid) may be used or the free acid itself may be coupled with compound II after first reacting said free acid with N,N'-dimethylchloroformiminium chloride [cf. Great Britain 1,008,170 and Novak and Weichet, *Experientia XXI, 6,* 360 (1965)] or by the use of enzymes or of an N,N'-carbonyldiimidazole or an N,N'-carbonylditriazole [cf. South African patent specification 63/2,684] or a carbodiimide reagent [especially N,N'-dicyclohexylcarbodiimide, N,N'-diisopropylcarbodiimide or N-cyclohexyl-N'-(2-morpholinoethyl)carbodiimide; cf. Sheehan and Hess, *J. Amer. Chem. Soc., 77,* 1067 (1955)], or of alkylylamine reagent [cf. R. Buijle and H. G. Viehe, *Angew, Chem. International,* Edition 3, 582, (1964)] or of an isoxasolium salt reagent [cf. R. B. Woodward, R. A. Olofson and H. Mayer, *J. Amer. Chem. Soc., 83,* 1010 (1961)], or of a ketenimine reagent [cf. C. L. Stevens and M. E. Mond, *J. Amer. Chem. Soc., 80,* (4065)].

Another equivalent of the acid chloride is a corresponding azolide, i.e., an amide of the corresponding acid whose amide nitrogen is a member of an quasiaromatic five membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quatitative yield with liberation of carbon dioxide and one mole of imidazole. Dicarboxylic acids yields diimidazolide. The by-product, imidazole, precipitates and may be separated and the imidazolide isolated, but this is not essential. The methods for carrying out these reactions to produce a cephalosporin and the methods used to isolate the cephalosporin so produced are well known in the art.

Mention was made above of the use of enzymes to couple the free acid with its blocked amino group with compound II. Included in the scope of such processes are the use of an ester, e.g. the methyl ester, of that free acid with enzymes provided by various microorganisms, e.g. those described by T. Takahashi et al., J. Amer. Chem. Soc., *94(11),* 4035–4037 (1972) and by T. Nara et al., J. Antibiotics (Japan) *24(5),* 321–323 (1971) and in U. S. 3,682,777.

In the treatment of bacterial infections in man, the compounds of this invention are administered parenterally, in accordance with conventional procedures for antibiotic administration, in an amount of from about 5 to 200 mg./kg./day and preferably about 5 to 20 mg./kg./day in divided dosage, e.g. three to four times a day. They are administered in dosage units containing, for example, 125, 250 or 500 mg. of active ingredient with suitable physiologically acceptable carriers or excipients. The dosage units are in the form of liquid preparations such as solutions or suspensions.

STARTING MATERIALS

Preparation of β-(o-aminomethylphenyl)propionic acid—Method A

β-(o-Aminomethylphenyl)propionic acid lactam (2): Preparation of β-(o-aminomethhylphenyl)propionic acid lactam (2) was carried out by a procedure which was a modification of the method of Knunyants and Fabrichnyi. I. L. Knunyants and B. P. Fabrichnyi, Doklady 9cad. Nauk, SSSR, *68,* 523 (1949); C.A. *44,* 1469 d (1950).

To a stirred mixture of 30 g. (0.2 mole) of β-tetralone and 14 g. (0.4 mole) of sodium azide in 400 ml. of chloroform was added dropwise 50 ml. of conc. sulfuric acid at 30–40° C. When the addition was completed, the mixture was stirred for 2 hours at 30° C. The reaction mixture was poured into 400 ml. of ice water and extracted with three 200 ml. portions of chloroform. The extracts were washed with 50 ml. of water, dried with anhydrous sodium sulfate and treated with a small amount of active carbon. The filtration was evaporated under reduced pressure to give 31 g. of the residual solid which was a mixture of β-(o-aminomethylphenyl) propionic acid lactam 2 and o-(2-aminoethyl)phenylacetic acid lactam 3.

Isolation of the desired lactam 2 was carried out by the procedure described below.

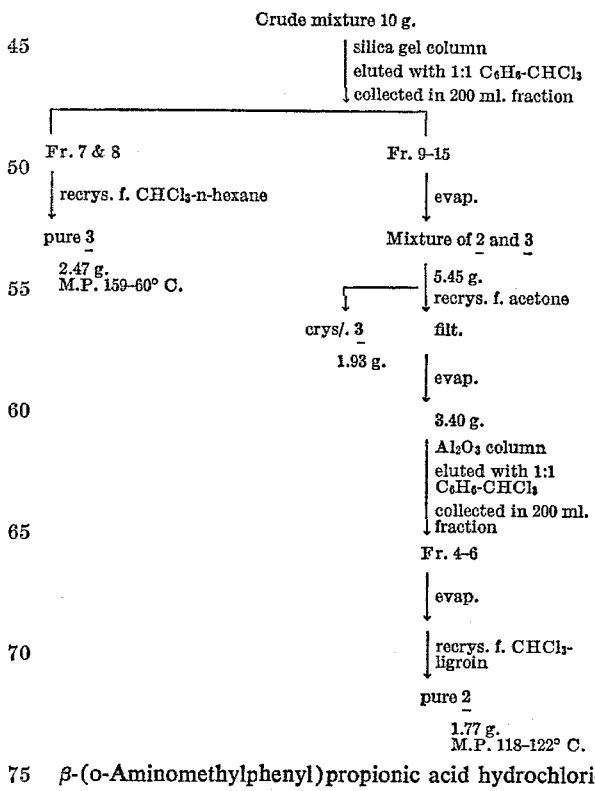

β-(o-Aminomethylphenyl)propionic acid hydrochloride

A solution of 1.77 g. (0.011 mole) of β-(o-aminomethylphenyl)propionic acid lactam (2) in 10 ml. of concentrated hydrochloric acid was refluxed for 4 hours and then evaporated to dryness. The residue was dissolved in 20 ml. of water, treated with a small amount of charcoal and filtered. The filtrate was concentrated to about 5 ml. An addition of 40 ml. of acetone to the concentrate gave β-(o-aminomethylphenyl)-propionic acid hydrochloride as colorless needles which were collected by filtration, washed with actone (10 ml.) and dried. Yield 1.21 g. (51%). M.P. 194–198° C.

IR: $\lambda_{max}^{KBr}$ 3300–2600, 1718, 1600, 1540, 1440 cm.$^{-1}$.
NMR: $\delta_{p.p.m.}^{DMSO-d_6}$ 2.4–4.0 (4 H, m, $C\underline{H}_2$—$C\underline{H}_2$—CO), 4.00 (2H, s, $C\underline{H}_2$—N), 7.0–7.40 (4 H, m, phenyl-$\underline{H}$), 8.50 (3 H, br-s, $\underline{NH}_3^+$).

Analysis.—Calcd. for $C_{10}H_{13}NO_3 \cdot HCl$: C, 55.69; H, 6.54; N, 6.49; Cl, 16.44. Found: C, 55.31; H, 6.50; N, 6.51; Cl, 16.61.

Preparation of o-aminomethylphenylpropionic acid—Method B o-Cyanophenylpropionic acid: A mixture of 8.23 g. (0.043 mole) of o-nitrophenylcinnamic acid and 2.80 g. (0.043 mole) of sodium hydroxide in 50 ml. of water was hydrogenated with 2.0 g. of 10% palladium on charcoal at 50 p.s.i. hydrogen pressure in a Parr apparatus until the theoretical volume of hydrogen was absorbed (about 3 hours). The catalyst was removed by filtration. Sodium nitrite (2.97 g., 0.043 mole) was added to the cold filtrate and the mixture was added dropwise to 16.6 g. (ca. 0.17 mole) of concentrated hydrochloric acid at 0–5° C. with vigorous stirring. To the mixture was added a cold solution of 2.40 g. (0.021 mole) of potassium carbonate in 10 ml. of water with stirring. This cold mixture was added to a mixture of 9.10 g. (0.14 mole) of potassium cyanide and 6.3 g. (0.07 mole) of cuprous cyanide in 33 ml. of water with vigorous stirring at 0–5° C. The mixture was stirred for 1 hour at 0–5° C., for 1 hour at room temperature and finally 1 hour at 50° C., and then filtered to remove insoluble material, the filtrate being washed with ethyl acetate (100 ml.), acidified with dil. hydrochloric acid to pH 3 and extracted with ethyl acetate (4× 100 ml.). The combined extracts were washed with water (100 ml.), treated with a small amount of charcoal and dried on anhydrous sodium sulfate. After removing the solvent the residue was crystallized from water (100 ml.) to give 4.31 g. (57%) of o-cyanophenylpropionic acid as light brown prisms. M.P. 126–127° C.; lit. 136° C.; see F. Mayer et al., Ber., 61, 1966 (1928).

IR: $\nu_{max}^{KBr}$ 2280, 1700 cm.$^{-1}$.
NMR: $\delta_{p.p.m.}^{CDCl_3}$ 2.5–3.5 (4 H, m, $CH_2$—$CH_2$), 7.0–7.7 (4 H, m, benzene-H), 10.15 (1 H, s, COOH).

o-Aminomethylphenylpropionic acid hydrochloride: A mixture of 2.30 g. (0.013 mole) of o-cyanophenylpropionic acid, 30 ml. of ethanol and 15 ml. of 6 N hydrochloric acid was hydrogenated with 1.0 g. of 10% palladium on charcoal at 50 p.s.i. hydrogen pressure. The theoretical amount of hydrogen was absorbed in 3 hours. The catalyst was filtered off and the filtrate was concentrated to give 2.2 g. (77%) of o-aminomethylphenylpropionic acid hydrochloride as colorless needles melting at 190–192° C. The product was identified with the authentic sample prepared by Schmidt rearrangement of β-tetralone followed by hydrolysis; see I. L. Knunyants and B. P. Fabrichnyi, Doklady Acad. Nauk. SSSR, 68, 523 (1949); C.A. 44, 1469 d (1950).

β-[o - Butoxycarbonylaminomethyl)phenyl]propionic acid: To an ice-cooled solution of 1.08 g. (5 mmoles) of β-(o-aminomethylphenyl)propionic acid hydrochloride, 17.1 g. (17 mmoles) of triethylamine in 8 ml. of water was added dropwise a solution of 1.07 g. (17 mmoles) of t-butoxycarbonylazide in 6 ml. of tetrahydrofuran with stirring. The stirring was continued for 19 hours and the temperature of the mixture was allowed to rise to room temperature. The reaction mixture was concentrated to remove tetrahydrofuran, washed with 50 ml. of ether, acidified to pH 3 with dilute hydrochloric acid and extracted with ethyl acetate (3× 100 ml.). The combined extracts were washed with water (50 ml.) and dried on anhydrous sodium sulfate and filtered. Concentration of the filtrate afforded β-[o-(t-butoxycarbonylaminomethyl)phenyl]propionic acid as colorless crystals which were collected by filtration. Recrystallization from ethyl acetate-n-hexane (1:1, 200 ml.) gave fine needles which melted at 117–117.5° C. Yield 1.01 g. (73%).

IR: $\nu_{max}^{KBr}$ 3380, 1690, 1530, 1280, 1170 cm.$^{-1}$.
NMR: $\delta_{p.p.m.}^{CDCl_3}$ 1.40 (9 H, s, t-Butyl-$\underline{H}$), 2.4–3.1 (4 H, m, $C\underline{H}_2$—$C\underline{H}_2$—CO), 4.25 (2 H, d, 6 Hz., $C\underline{H}_2$—N), 7.10 (4 H, s, phenyl-$\underline{H}$), 8.40 (2 H, br-s, N$\underline{H}$ and COO$\underline{H}$).

Analysis.—Calcd. for $C_{15}H_{21}NO_4$: C, 64.50; H, 7.58; N, 5.01. Found: C, 64.64; H, 7.56; N, 5.08.

2,4 - dinitrophenyl[β-o-(t-butoxycarbonylaminomethyl)phenyl]propionate: To a cooled (5° C.) solution of 0.98 g. (3.5 mmoles) of β-[o-(tert-butoxycarbonylaminomethyl)phenyl]propionic acid and 0.65 g. (3.5 mmoles) of 2,4-dinitrophenol in 15 ml. of dry ethyl acetate was added 0.72 g. (3.5 mmoles) of N,N'-dicyclohexylcarbodiimide with stirring for one hour at room temperature. The mixture was filtered to remove N,N'-dicyclohexylurea which was washed with ethyl acetate (10 ml.). The filtrate was combined with the washing and evaporated to dryness to give yellow oily active ester 2,4-dinitrophenyl[β - o-(t - butoxycarbonylaminomethyl)phenyl]propionate ($\nu_{C=O}^{Liq.}$ 1770, 1710 cm.$^{-1}$).

This active ester was used for the preparation of cephalosporanic acid derivatives without further purification.

7-[β - (o - t-butoxycarbonylaminomethylphenyl)propionamido]-3 - (tetrazolo[4,5-b]pyridazin - 6 - ylthiomethyl)-3-cephem-4-carboxylic acid: N,N'-dicyclohexylcarbodiimide (0.41 g., 2 mmole) was added to a mixture of β-(o-t - butoxycarbonylaminomethylphenyl)propionic acid (0.56 g., 2 mmole) and 2,4-dinitrophenyl (0.37 g., 2 mmole) in 5 ml. of THF and the mixture was stirred for 1 hr. at room temperautre. The precipitated urea was filtered off. To the filtrate was added a solution of 7-amino-3-(tetrazolo[4,5-b]pyridazin - 6 - ylthiomethyl)-3-cephem-4-carboxylic acid (0.73 g., 2 mmole) and triethylamine (0.81 g., 8 mmole) in 10 ml. of 50% aqueous THF and the mixture was stirred for 18 hr. at room temperature. The reaction mixture was washed with ether (2× 20 ml.) and the aqueous layer was acidified to pH 2 with dil. HCl and extracted with ethyl acetate (3× 50 ml.). The combined extracts were washed with water (30 ml.), treated with active carbon, dried on anhydrous $Na_2SO_4$ and evaporated under reduced pressure to an oil. The oil was triturated with 50 ml. of ether to give 7-[β-(o-t - butoxycarbonylaminomethylphenyl) propionamido]-3-(tetrazolo[4,5-b]pyridazin - 6 - ylthiomethyl)-3-cephem-4-carboxylic acid as a colorless solid which was collected by filtration and dried in vacuo on $P_2O_5$.

Yield 0.33 g. (26%). M.P. 110–120° (dec.).

IR: $\nu_{max}^{KBr}$ 1780, 1710, 1690, 1530, 1370, 1250 cm.$^{-1}$.
UV: $\lambda_{max}^{1\% NaHCO_3}$ 240 nm. ($\epsilon$ 19400), 270 nm. (sh) ($\epsilon$ 12500), 310 nm. (sh) ($\epsilon$ 5000).
NMR: $\delta_{p.p.m.}^{DMSO-d_6}$ 1.37 (9 H, s, t-Bu-$\underline{H}$), 4.96 (1 H, d, 4 Hz, 6-$\underline{H}$), 5.55 (1 H, d-d, 4 & 8 Hz, 7-$\underline{H}$), 6.99 (4 H, s, phenyl-$\underline{H}$), 7.57 (1 H, d, 10 Hz, pyridazine-$\underline{H}$), 8.38 (1 H, d, 10 Hz, pyridazine-$\underline{H}$), 8.69 (1 H, d, 8 Hz, CON$\underline{H}$).

Analysis.—Calcd. for $C_{27}H_{30}N_8O_6S_2 \cdot \frac{1}{2}H_2O$: C, 51.02; H, 4.91; N, 17.63. Found: C, 51.74; H, 4.83; N, 17.88.

Preparation of 6-mercaptotetrazolo[4,5-b]pyridazine

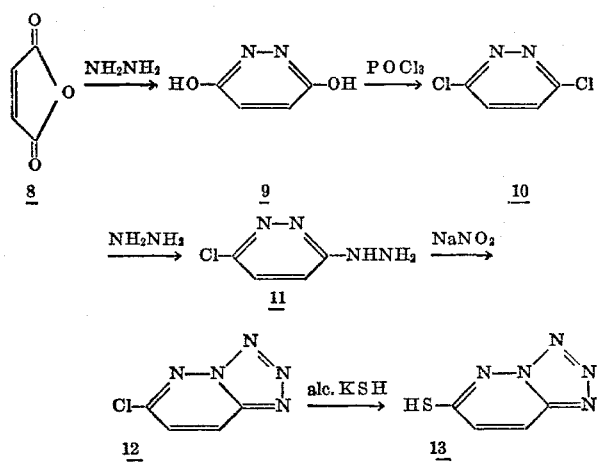

3,6-dihydroxypyridazine (9): To a boiling solution of 315 g. (3 moles) of hydrazine dihydrochloride in 2 l. of water was added portionwise 295 g. (3 moles) of finely ground maleic anhydride 8 with stirring. After the addition was completed the heating was continued for 4 hours and then allowed to stand overnight in a refrigerator to give 285 g. (85%) of 9 as massive pillars. M.P. >290° C.

3,6-dichloropyridazine (10): A mixture of 150 g. (1.33 moles) of 9 and 250 g. of phosphorus oxychloride was refluxed for 3 hours under protection from moisture. The excess of phosphorus oxychloride was removed under reduced pressure and the dark residue was poured into one kg. of crushed ice. The resulting precipitate was collected by filtration. The second crop of the product was obtained from the mother liquor by the extraction with five 300 ml. portions of chloroform followed by treating with 1 g. of charcoal and evaporating the solvent. The first and second crops were combined, dissolved in 500 ml. of chloroform and treated again with one g. of charcoal and concentrated to give 165 g. (83%) of 10 as fine needles melting at 60–61° C. (in a sealed tube).

3-chloro-6-hydrazinopyridazine (11): A mixture of 40 g. (0.27 mole) of 3,6-dichloropyridazine (10) and 40 ml. of 80% hydrazine hydrate in 80 ml. of ethanol was refluxed for one hour. The reaction mixture was evaporated to dryness and the residue was recrystallized from benzene to give 39 g. (100%) of 11 melting at 114–115° C.

6-chlorotetrazolo[4,5-b]pyridazine (12): To a solution of 25.7 g. (0.174 mole) of 11 in 100 ml. of 15% acetic acid was added dropwise a solution of 13.8 g. (0.2 mole) of sodium nitrite in 50 ml. of water with vigorous stirring at 5–10° C. Stirring was continued for one hour at the same temperature. The precipitate which separated was filtered, washed with 20 ml. of water and air-dried to give 17.02 g. of 12. Additional product was obtained by evaporation of the filtrate. Total yield 18.32 g. (64%). M.P. 104–105° C.

6-mercaptotetrazolo[4,5-b]pyridazine (13): A mixture of 21.3 g. (0.137 mole) of 12 and 20 g. (0.25 mole) of potassium hydrosulfide in 200 ml. of ethanol was refluxed for 2 hours and evaporated to dryness. The residue was dissolved in 100 ml. of water and filtered to remove a small amount of insoluble material. The filtrate was acidified to pH 1 with dil. hydrochloric acid to precipitate 4 as colorless needles which were collected by filtration, washed with 20 ml. of water and dried. Yield 9.80 g. (47%). M.P. 140–141° C. (dec.).

IR: $\nu_{max}^{KBr}$ 2500, 1540, 1445, 1295, 840 cm.$^{-1}$.
NMR: $\delta_{p.p.m.}^{D_2O+K_2CO_3}$ 7.44 (1 H, d, 10 Hz., pyridazine-$\underline{H}$), 7.77 (1 H, d, 10 Hz., pyridazine-$\underline{H}$).

Analysis.—Calcd. for $C_4H_3N_5S$: C, 31.37; H, 1.97; N, 45.72; S, 20.94. Found: C, 31.52; 31.66; H, 1.70; 1.69; N, 46.01; 46.01; S, 20.95.

Preparation of 7-amino-3-(tetrazolo[4,5-b]pyridazin-6-ylthiomethyl)-3-cephem-4-carboxylic acid

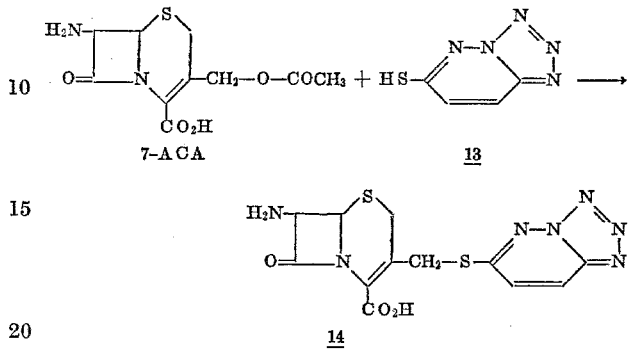

7-amino-3-(tetrazolo[4,5-b]pyridazin-6-ylthiomethyl)-3-cephem-4-carboxylic acid (14): (i) To a hot solution (50–60° C.) of 9.56 g. (0.062 mole) of 13 and 10.42 g. (0.124 mole) of sodium bicarbonate in 300 ml. of water was added carefully 16.86 g. (0.062 mole) of 7-ACA and the mixture was heated at 80–85° C. for 30 minutes. About 7 g. of sodium bicarbonate was added to the reaction mixture to dissolve insoluble material. The solution was treated with active carbon, filtered and the filtrate was acidified to pH 5 with dil. hydrochloric acid. The precipitate was collected by filtration, washed with water, air-dried and finally in vacuo on $P_2O_5$ to give 14.47 g. (64%) of 14. M.P. 248–250° C. (dec.).

(ii) A stirred solution of 16.8 g. (0.11 mole) of 13 and 18.48 g. (0.22 mole) of $NaHCO_3$ in 1 l. of 0.1 M phosphate buffer (pH 6.4) was heated at 50° C. and to the solution was added portionwise 30 g. (0.11 mole) of 7-ACA. The mixture was heated at 80° C. for 2.5 hours, during which period insoluble material still remained. The reaction mixture was cooled to room temperature and the precipitated 14 was collected by filtration, washed thoroughly with 200 ml. of water and air-dried.

Additional 14 was obtained from the filtrate and the washings by acidifying to pH 5 with dil. HCl. Total yield 32.9 (83%). M.P. 245–250° C. (dec.).

IR: $\nu_{max}^{KBr}$ 1800, 1615, 1538, 1360 cm.$^{-1}$.
UV: $\lambda_{max}^{1\% NaHCO_3}$ 237 nm. ($\epsilon$ 19500), 275 nm. ($\epsilon$ 12000), 310 nm. (sh) ($\epsilon$ 5700).
NMR: $\delta_{p.p.m.}^{D_2O+K_2CO_3}$ 3.35 (1 H, d, 18 Hz., 2-$\underline{H}$), 3.76 (1 H, d, 18 Hz., 2-$\underline{H}$), 4.00 (1 H, d, 10 Hz., 3-$\underline{CH_2}$), 4.48 (1 H, d, 10 Hz., 3-$\underline{CH_2}$), 4.93 (1 H, d, 4 Hz., 6-$\underline{H}$), 5.32 (1 H, d, 4 Hz., 7-$\underline{H}$), 7.46 (1 H, d, 10 Hz., pyridazine-$\underline{H}$), 8.18 (1 H, d, 10 Hz., pyridazine-$\underline{H}$).

Analysis.—Calcd. for $C_{12}H_{11}N_7O_3S_2 \cdot \frac{1}{2}H_2O$: C, 39.44; H, 3.03; N, 26.83; S, 17.55. Found: C, 39.19; H, 2.71; N, 26.84; S, 17.35.

The following examples are given in illustration of, but not in limitation of, the present invention. All temperatures are in degrees centigrade. 7-aminocephalosporanic acid is abbreviated as 7-ACA; —ACA— represents the moiety having the structure

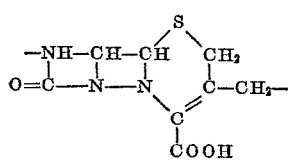

and thus 7-ACA can be represented as

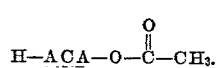

13

Methyl isobutyl ketone is represented as MIBK. "Skellysolve B" is a petroleum ether fraction of B.P. 60–68° C. consisting essentially of n-hexane.

DESCRIPTION OF THE PREFERRED EMBODIMENTS

Example 1

7 - [β-(o-aminomethylphenyl)propionamido]-3-(tetrazolo[4,5-b]pyridazin - 6 - ylthiomethyl)-3-cephem-4-carboxylic acid: Trifluoroacetic acid (0.5 ml.) and 7-[β-(o-tert - butoxycarbonylaminomethylphenyl)propionamido] - 3-(tetrazolo[4,5-b]pyridazin - 6 - ylthiomethyl)-3-cephem-4-carboxylic acid (0.28 g., 0.46 mmole) were mixed under cooling at 0° and stirred for 30 min. Ether (50 ml.) was added to the mixture to give the trifluoroacetate of 7-[β-(o-aminomethylphenyl)propionamido] - 3 - (tetrazolo-[4,5-b]pyridazin - 6 - ylthiomethyl)-3-cephem-4-carboxylic acid which was separated by decantation, washed with ether, dissolved in water (1 ml.) and adjusted to pH 6 with dil. $NH_4OH$. The product 7-[β-(o-aminomethylphenyl)propionamido] - 3 - (tetrazolo[4,5-b]pyridazin-6-ylthiomethyl)-3-cephem-4-carboxylic acid was collected by filtration and dried in vacuo on $P_2O_5$. Yield 0.10 g. (42%). M.P. 190–197° (dec.).

IR: $\nu_{max}^{KBr}$ 1760, 1665, 1600, 1535, cm.$^{-1}$

Analysis.—Calcd. for $C_{22}H_{22}N_8O_4S_2 \cdot \frac{1}{2}H_2O$: C, 49.33; H, 4.33; N, 20.92; S, 12.18. Found: C, 49.04; H, 4.26; N, 20.17; S, 11.96.

Example 2

Sodium β-[o-(1 - ethoxycarbonyl-1-propen-2-ylaminomethyl)phenyl]propionate: To an alcoholic sodium ethoxide solution (metallic sodium 5.75 g. (0.25 atom) and absolute ethanol 500 ml.) are added 0.25 mole of β - [o - aminomethylphenyl]propionic acid (obtained by neutralization of its hydrochloride with aqueous ammonia) and 32.5 g. (0.25 mole) of ethyl acetoacetate successively. The mixture is refluxed for 6 hours and treated with active carbon and filtered through diatomaceous earth ("Dicalite"). The filter bed is washed with 200 ml. of hot ethanol. The combined filtrate and washings are evaporated to near dryness and cooled to 0° to give sodium β-[o-(1-ethoxycarbonyl-1-propen-2-ylaminomethyl)phenyl]propionate as colorless needles which are collected by filtration, washed with 200 ml. of ethanol and dried in vacuo over $P_2O_5$. An additional amount is obtained by concentration of the mother liquor. Total yield about 50 g.

7-[β-(o-aminomethylphenyl)propionamido] - 3 - (tetrazolo[4,5-b]pyridazin - 6 - ylthiomethyl)-3-cephem-4-carboxylic acid: Ethyl chloroformate (6.87 g., 0.0063 mole) is added in one portion to a stirred suspension of 0.057 mole of sodium β-[o-(1-ethoxycarbonyl-1-propen-2-ylaminomethyl)phenyl]propionate in 200 ml. of dry THF containing 1 ml. of N,N-dimethylbenzylamine at —15°. Stirring is stopped and a cooled solution of 20.80 g. (0.057 mole) of 7-amino-3-(tetrazolo[4,5-b]pyridazin-6-ylthiomethyl)-3-cephem - 4 - carboxylic acid and 9.60 g. (0.095 mole) of triethylamine in 200 ml of 50% aqueous THF is added slowly along the wall. The mixture is stirred vigorously for 30 min. at 0–15°, treated with active carbon and filtered through "Dicalite." The bed is washed with 50 ml. of 50% aqueous THF containing 8 ml. of triethylamine. Formic acid (3 ml.) is added to a combined solution of the filtrate and the washings to precipitate unreacted 7-ACA (2.5 g.) which is filtered off. The filtrate is mixed with 200 ml. of ether and then 15 ml. of formic acid. The mixture is stirred for 10–15 min. at room temperature and the resulting precipitate is collected by filtration, washed with 100 ml. of ether and 500 ml. of water successively and dried in vacuo on $P_2O_5$ to yield 7-[β-(o-aminomethylphenyl)propionamido] - 3 - (tetrazolo[4,5-b]pyridazin-6-ylthiomethyl)-3-cephem-4-carboxylic acid, about 20 g.

14

Recrystallization of 7-[β-(o-aminomethylphenyl)propionamido] - 3 - (tetrazolo[4,5-b]pyridazin - 6 - ylthiomethyl)-3-cephem - 4 - carboxylic acid. The amorphous product described above (13 g.) is dissolved in 1.2 l. of 50% aqueous THF at 50–60° under vigorous stirring, treated with 5 g. of active carbon and filtered. The filtrate is seeded and stored in a refrigerator overnight to give about 8 g. as fine needles.

Example 3

A suspension of zwitterionic form of 7-[β-(o-aminomethylphenyl)propionamido] - 3 - (tetrazolo[4,5-b]pyridazin-6-ylthiomethyl)-3-cephem - 4 - carboxylic acid (0.361 g.) in 3 ml. of methanol is cooled in ice and treated with a few drops of concentrated hydrochloric acid until a clear solution is obtained. 7-[β-(o-aminomethylphenyl)propionamido] - 3 - (tetrazolo[4,5-b]pyridazin-6-ylthiomethyl)-3-cephem - 4-carboxylic acid hydrochloride precipitates as a pale brown colored solid upon the addition of the ether and is collected by filtration and dried in vacuo over $P_2O_5$.

Example 4

To a stirred suspension of the zwitterionic form of 7-[β-(o - aminomethylphenyl)propionamido] - 3 - (tetrazolo)[4,5-b]pyridazin - 6 - ylthiomethyl - 3 - cephem-4-carboxylic acid (0.361 g.) is added 1 N-aqueous sodium hydroxide at room temperature until a clear solution (pH 10.8) is obtained. This solution is immediately freeze-dried to give impure, solid sodium 7-[β-(o-aminomethylphenyl)propionamido] - 3 - (tetrazolo[4,5-b]pyridazin-6-ylthiomethyl)-3-cephem-4-carboxylate.

PREPARATIONS OF DIMETHANESULFONATE

Example 5

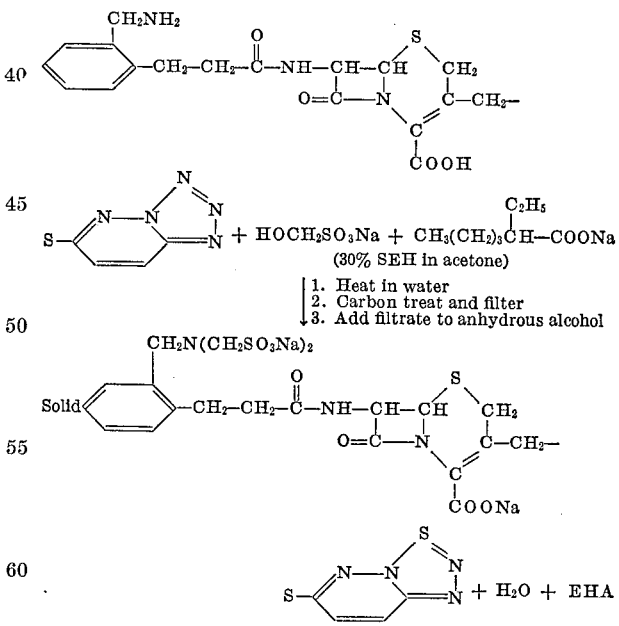

Procedure: Put 2.0 moles (about 1053 g. of an anhydrous basis) of 7 - [β-(o-aminomethylphenyl)propionamido] - 3 - tetrazolo[4,5-b]pyridazin - 6-ylthiomethyl)-3-cephem-4-carboxylic acid, 540 g. of sodium formaldehyde bisulfite (4.03 moles), 3000 ml. of water and 2700 ml. (4.87 moles) of 30% SEH (sodium 2-ethylhexanoate) in acetone in a suitable tank and with stirring heat the mixture to 40–45° C. The mixture dissolves in about 10 min. to a yellow solution.

After 15 minutes of heating add 50 g. of decolorizing charcoal ("Darco KB") to the solution and stir 15 minutes more at 40–45° C.

Filter through diatomaceous earth ("Dicalite") after heating the reaction at 40–45° C. for a total of 30 minutes.

Wash the carbon cake with 2000 ml. of 50% ethanol-water.

Combine the filtrates, adjust to 25° C. and add the solution at 25° C. to 112 liters of rapidly stirred 100% ethyl alcohol. A fine white amorphous precipitate of the di(sodium-methane sulfonate) of sodium 7-[β-(o-aminomethylphenyl)propionamido] - 3 - tetrazolo[4,5 - b]pyridazin-6-ylthiomethyl)-3-cephem-4-carboxylate forms.

Stir the suspension for about 10 minutes and then filter and wash the cake with 15 liters of 100% ethyl alcohol.

Dry the cake at 50–55° C. in an oven with air circulating for about 2 hours and then under vacuum at 4–6 mm. for 24 hours.

The yield is about 1200–1400 g. of amorphous, white, solid di(sodium-methane sulfonate) of sodium 7-[β-(o-aminomethylphenyl)propionamido] - 3 - tetrazolo[4,5-b]pyridazin-6-ylthiomethyl) - 3 - cephem - 4 - carboxylate. The product usually contains several percent water and possibly a trace of ethanol.

This product is also named sodium 7-{β-[o-N,N-bis(sodiosulfomethyl)aminomethylphenyl]propionamido} - 3 - (tetrazolo[4,5-b]pyridazin - 6 - ylthiomethyl)-3-cephem-4-carboxylate.

EXAMPLE 6

The following slurry is prepared:

2.19 grams of sodium-formaldehyde bisulfite (2 equivalents).

3.5 g. of 7-[β-(o-aminomethylphenyl)propionamido]-3-(tetrazolo[4,5-b] - pyridazin-6-ylthiomethyl)-3-cephem-4-carborylic acid zwitterion (100–200 mesh).

25 ml. of water (volume can be varied).

14 ml. of 30% SEH-isopropanol.

A near solution is obtained in about 0.5 hour of rapid stirring at 24° C. The temperature of the mixture is raised rapidly to 40–43° C. This is maintained for about two minutes and then rapidly cooled to 20–23° C.

The solution is filtered to remove some insolubles (total time in solution should not exceed two hours).

The pH 7.3 solution is added over a 5 minute period to 600 ml. of very rapidly stirring absolute ethanol (other alcohols such as anhydrous isopropanol may be used). An amorphous precipitate of the di(sodium-methane sulfonate) of sodium 7-[β-(o-aminomethylphenyl)propionamido] - 3 - (tetrazolo[4,5-b]pyridazin-6-ylthiomethyl)-3-cephem-4-carboxylate forms. The mixture is stirred for 5 minutes. The precipitate is collected by filtration, washed with 60 ml. of ethanol (or isopropanol) and vacuum dried at 50° C. for 24 hours. The yield is about 4 g.

The product is soluble in water at about pH 7 to the extent of at least 200 mgm./ml. Such a solution is stable for at least two hours at room temperature; more dilute solutions are stable even longer. The product shows the same antibacterial spectrum as the parent zwitterion and is fully biologically active whether it has hydrolyzed back to the zwitterion or not.

EXAMPLE 7

Sodium 7-{β-[o-N,N-bis(sodiosulfomethyl)aminomethylphenyl] - propionamido} - 3-(tetrazolo[4,5-b]pyridazin-6 - ylthiomethyl) - 3-cephem-4-carboxylate: Preparation using hydroxymethanesulfonate — A mixture of 1.95 mmole of 7-[β-(o-aminomethylphenyl)-propionamido]-3-(tetrazolo[4,5-b]pyridazin - 6 - ylthiomethyl)-3-cephem-4-carboxylic acid, 1.52 g. (10 mmole) of sodium hydroxymethanesulfonate monohydrate, 6 ml. (6 mmole) of 1 $M$ SEH solution in ethyl acetate, 10 ml. of isopropanol and 10 ml. of water is stirred at room temperature for 3.5 hrs. The resulting solution is treated with 1 g. of active carbon and poured under stirring into 300 ml. of abs. ethanol and the mixture is stirred at room temperature for 30 min. to give the crystalline product which is collected by filtration, washed with three 50 ml. portions of abs. ethanol and dried over $P_2O_5$ at 45–52°/1 mm. for 20 hrs. to give about 1.5 g. of sodium 7-{β-[o-N,N-bis-(sodiosulfomethyl)aminomethylphenyl]propionamido}-3-(tetrazolo[4,5-b]-pyridazin - 6 - ylthiomethyl)-3-cephem-4-carboxylate which is readily soluble in water (>1 g./ml.).

EXAMPLE 8

Preparation using formalin and sodium bisulfite: (a) To a solution of 1 ml. (10 mmole) of 30% formalin and 1 g. of sodium bisulfite in 10 ml. of water is added successively 2 mmole of 7-[β-(o-aminomethylphenyl)propionamido] - 3 - (tetrazolo[4,5-b]pyridazin - 6 - ylthiomethyl)-3-cephem-4-carboxylic acid, 6 ml. of 1 $M$ SEH solution and 10 ml. of isopropanol. The mixture is stirred for 2.5 hours at room temperature and poured into 300 ml. of ethanol. The resulting sodium 7-{β-[o-N,N-bis(sodiosulfomethyl) - aminomethylphenyl]propionamido}-3-(tetrazolo[4,5-b]pyridazin - 6 - ylthiomethyl)-3-cephem-4-carboxylate is collected by filtration, washed with three 50 ml. portions of ethanol and dried in vacuo. Yield about 1.5 g.

(b) To a mixture of 2 mmole of 7-[β-(o-aminomethylphenyl) - propionamido] - 3 - (tetrazolo[4,5-b]pyridazin-6-ylthiomethyl)-3-cephem-4-carboxylic acid, 6 ml. of 1 $M$ SEH in ethyl acetate, 10 ml. of isopropanol and 10 ml. of water is added 1 ml. (10 mmole) of 30% formalin. The mixture is stirred for 2 hours at room temperature to give a clear solution with a small amount of oily precipitate. After 1 g. of sodium bisulfite is added, the solution is stirred for an additional 2 hours, during which time the oily precipitate dissolves in the solution. The reaction mixture is poured into 300 ml. of ethanol under vigorous stirring to give about 1.5 g. of sodium 7-{β-[o-N,N-bis-(sodiosulfomethyl)aminomethylphenyl] - propionamido}-3 - (tetrazolo[4,5-b]pyridazin - 6 - ylthiomethyl) - 3-cephem-4-carboxylate which is collected by filtration, washed with three 50 ml. portions of ethanol and dried in vacuo.

IN VITRO AND IN VIVO STUDIES

7 - [(o - aminomethyl)phenylpropionamido]-3-(tetrazolo[4,5-b]pyridazin - 6 - ylthiomethyl)-3-cephem-4-carboxylic acid, is a new broad-spectrum semi-synthetic cephalosporin having the structure shown below.

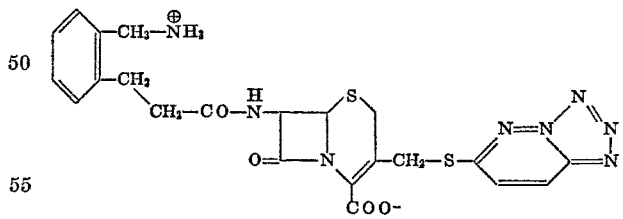

It has been shown to possess excellent in vitro and in vivo activities against a wide variety of Gram-positive and Gram-negative bacteria including those which are resistant to cephalothin and cephaloridine. Its dimethane-sulfonate adduct having the structure

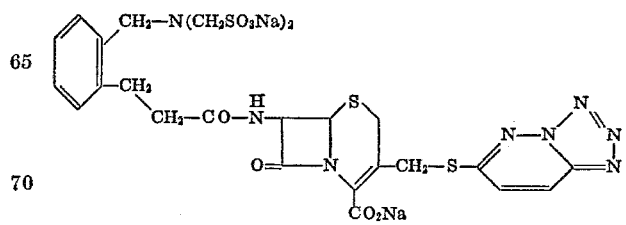

is prepared as a water-soluble preparation useful for injection and for studies of absorption and excretion, acute toxicity and pain liability upon injection.

Initial studies of *in vitro* antibacterial activity by the tube dilution method or agar dilution method of this new cephalosporin showed Minimum Inhibitory Concentrations (M.I.C.'s) of less than 1.0 mcg./ml. for all or nearly all strains tested of *Staphylococcus aureus, Streptococcus pyogenes* and *Diplococcus pneumoniae* and M.I.C.'s usually less than 4 mcg./ml. and often less than 1.0 mcg./ml. against various strains of *Salmonella enteritidis* and *Enterobacter cloacae*.

The *in vivo* efficacy of this compound by subcutaneous injection was studied in mice having an experimental infection caused by pathogenic, penicillinase-positive *S. aureus*. The median curative dose ($CR_{50}$) was about 1.6 mgm./kg.

We claim:
1. The compound of the formula

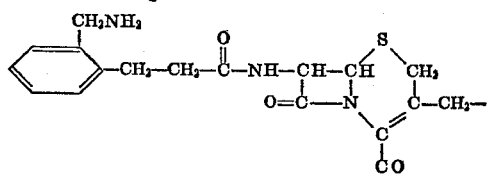

2. The sodium salt of the compound of claim 1.
3. The potassium salt of the compound of claim 1.
4. The hydrochloride of the compound of claim 1.
5. The zwitterion form of the compound of claim 1.
6. A nontoxic, pharmaceutically acceptable acid addition salt of the compound of claim 1.
7. The compound of the formula

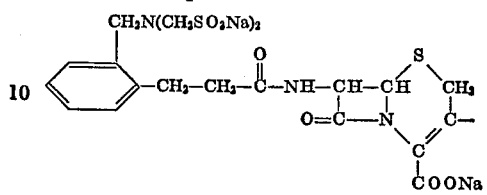

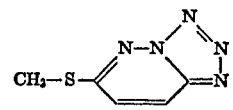

References Cited
UNITED STATES PATENTS 3,382,241  5/1968  Flynn _____ 260—243 C
3,641,021  2/1972  Ryan _____ 260—243 C NICHOLAS S. RIZZO, Primary Examiner U.S. Cl. X.R.

424—240